Dec. 2, 1924.

W. J. BLIFFERT

PEDAL LOCK

Filed May 12, 1924

1,517,699

Patented Dec. 2, 1924.

1,517,699

UNITED STATES PATENT OFFICE.

WALTER J. BLIFFERT, OF MILWAUKEE, WISCONSIN.

PEDAL LOCK.

Application filed May 12, 1924. Serial No. 712,724.

*To all whom it may concern:*

Be it known that I, WALTER J. BLIFFERT, a citizen of the United States, and resident of Milwaukee, in the county of Milwaukee and State of Wisconsin, have invented certain new and useful Improvements in Pedal Locks; and I do hereby declare that the following is a full, clear, and exact description thereof.

This invention relates to pedal locks.

In adjusting the brakes of automobiles, difficulty has been experienced due to the fact that it necessitated the activities of two operators, one to hold the brake pedal down at the desired point, and the other to adjust the brake mechanism to secure the exact co-relation of brakes required.

This difficulty has increased due to the use of four wheel brakes, as it is imperative in this type of braking to secure an application of the rear brakes either prior to or in excess of the application of the front brakes. Inasmuch as the brake pedal was not always held at the exact desired point, variations in the pressure occurred, and it has been found difficult and slow to adjust the brakes to the exact point.

This invention is designed to overcome the above noted defects, and objects of such invention are to provide a brake pedal lock or adjusting device which will hold the brake pedal at any desired point with reference to some other portion of the automobile, for instance, the clutch pedal, which may be adjusted to hold the brake pedal at any intermediate point, and which is adapted for use upon different makes of cars, thus dispensing with one operator, and in addition securing a more certain and exact adjustment.

Figure 1:
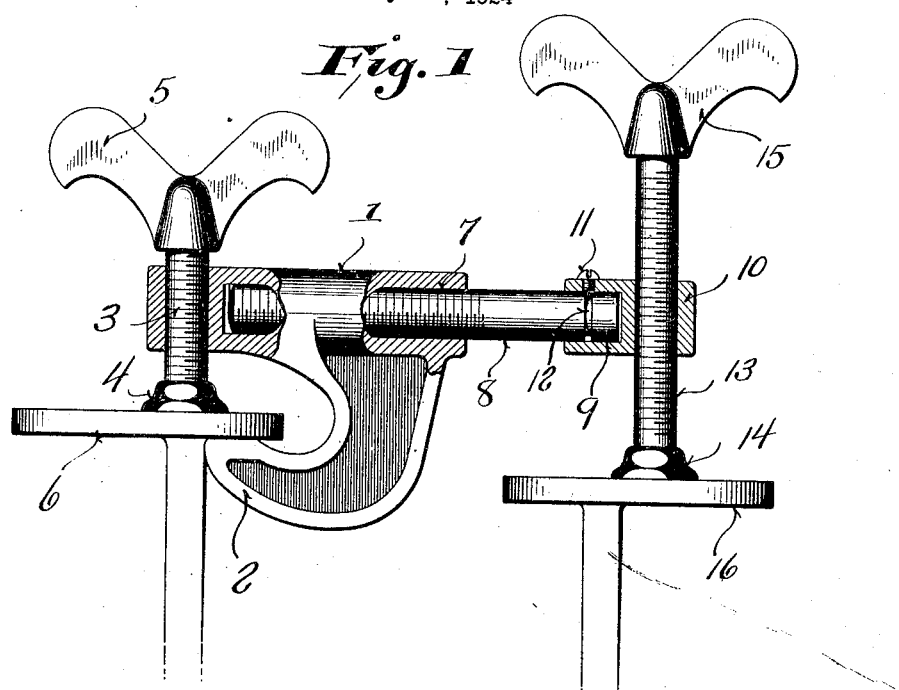

Embodiments of the invention are shown in the accompanying drawings, in which Figure 1 is a view of the device showing it in use, such view being partly in section.

Figure 2:
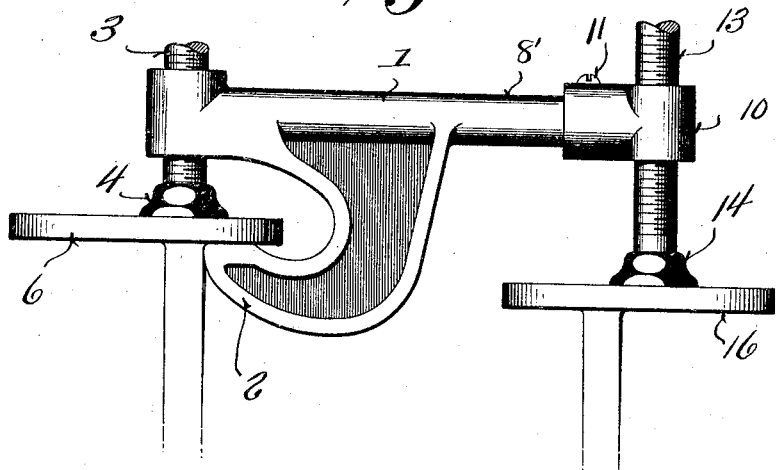

Figure 2 is a corresponding view with parts broken away showing a further form of the invention.

The device comprises a body portion 1 which is equipped with an underhanging lip 2 and with an adjustable screw 3 provided with a swivelled bearing end 4 and with adjusting wings 5. This body portion is adapted to be clamped to the clutch pedal 6 when in use, and when the clutch pedal is in its most elevated position.

The body portion is provided with an internally threaded aperture 7 within which a relatively heavy laterally projecting threaded rod 8 is received. This rod 8 has its outer end received in the socket 9 of a member 10. If desired, a screw 11 may be threaded through such member 10 and may have its reduced end seated within a slot 12 formed in the rod 8 so as to permit swivelling of the cap or end 10 with reference to the rod 8. This member 10 is provided with an internally threaded aperture through which an adjusting screw 13 passes such screw being provided with a swivelled pressure foot 14 and with adjusting wings or ears 15.

In the form shown in Figure 2, the rod 8' is made integral with the body portion 1. The device otherwise is of substantially the same construction as that illustrated in Figure 1,—the head 10 being freely swivelled on the rod 8.

In using the device, the body portion 1 is clamped to the clutch pedal 6 and the screw 13 is adjusted until the pressure foot 14 depresses the brake pedal 16 to the exact point desired. The operator is then free to adjust the brake mechanism to secure the desired co-relation without any further attention to the brake pedal depressing device.

It is to be noted that the form shown in Figure 1 may be adjusted to any type of car, and is preferably used where a variety of cars are operated upon. However, it sometimes happens that this adjustability between the screws 3 and 13 is not needed. In this case the form shown in Figure 2 is employed.

It will be noted that the head 10 can freely swivel upon the rod 8, as shown in Figure 1 or upon the rod 8', as shown in Figure 2. This permits the automatic adjusting of the device to accommodate different angular positions of the face of the brake pedal 16.

It is further to be noted that the brake pedal may be held at any desired point, and that the exact relative adjustment of the different brake mechanisms for the different settings of the brake pedal may be easily made.

Although the invention has been described in considerable detail, it is to be understood that the invention may be variously embodied and is, therefore, to be limited only as claimed.

I claim:

1. A device for use with automobiles having a clutch pedal and a brake pedal, said device comprising a clamp adapted to be secured to said clutch pedal and having an outwardly extending adjustable arm, a head swivelled to the outer end of said arm, and a pressure screw passing through said head and adapted to bear upon said brake pedal to hold such brake pedal in any desired position of adjustment.

2. A clamp comprising a body portion having an underhanging jaw, a screw threaded through said body portion and adapted to clamp an object against said jaw, an adjustable rod screwed into said body portion, a head swivelled to the outer end of said rod, and a pressure screw carried by said head and extending transversely of said rod.

3. A clamp comprising a body portion provided with an underhanging jaw, a screw carried by said body portion and positioned above said jaw, said body portion having an outwardly projecting arm, and a pressure screw carried by said arm and extending transversely thereof.

In testimony that I claim the foregoing I have hereunto set my hand at Milwaukee, in the county of Milwaukee and State of Wisconsin.

WALTER J. BLIFFERT.